United States Patent
Blake

(10) Patent No.: US 12,346,675 B1
(45) Date of Patent: Jul. 1, 2025

(54) COMPILATION AND EXECUTION OF CODE CHANGES WITHIN A RUNNING JAVA VIRTUAL MACHINE

(71) Applicant: Morgan Stanley Services Group Inc., New York, NY (US)

(72) Inventor: David Michael Blake, London (GB)

(73) Assignee: Morgan Stanley Services Group Inc., New York, NY (US)

(*) Notice: Subject to any disclaimer, the term of this patent is extended or adjusted under 35 U.S.C. 154(b) by 0 days.

(21) Appl. No.: 18/945,838

(22) Filed: Nov. 13, 2024

(51) Int. Cl.
*G06F 8/41* (2018.01)
*G06F 9/455* (2018.01)
*G06F 16/17* (2019.01)

(52) U.S. Cl.
CPC ............ *G06F 8/41* (2013.01); *G06F 9/45504* (2013.01); *G06F 16/1734* (2019.01)

(58) Field of Classification Search
CPC ..... G06F 8/41; G06F 9/45504; G06F 16/1734
USPC ................................. 717/140–148, 162–167
See application file for complete search history.

(56) References Cited

U.S. PATENT DOCUMENTS

| | | | |
|---|---|---|---|
| 6,118,940 A | 9/2000 | Alexander, III et al. | |
| 6,754,889 B1* | 6/2004 | Leverenz | G06F 9/445 717/148 |
| 6,851,112 B1* | 2/2005 | Chapman | G06F 9/44521 718/1 |
| 7,426,721 B1 | 9/2008 | Saulpaugh et al. | |
| 7,444,629 B2* | 10/2008 | Chirakansakcharoen | G06F 9/445 717/177 |
| 7,665,075 B1 | 2/2010 | Daynes et al. | |
| 8,276,125 B2* | 9/2012 | Fan | G06F 9/445 717/133 |
| 8,752,008 B2 | 6/2014 | Herdeg et al. | |
| 9,760,591 B2* | 9/2017 | Caudy | G06F 16/24553 |
| 10,146,515 B1* | 12/2018 | Sundresh | G06F 8/48 |
| 10,146,522 B1 | 12/2018 | Sundresh | |
| 10,223,097 B2* | 3/2019 | Weber | G06F 8/41 |
| 10,698,668 B1 | 6/2020 | Pohlack et al. | |
| 11,237,952 B1 | 2/2022 | Pearson et al. | |
| 11,573,787 B1* | 2/2023 | Hashimi | G06F 8/42 |
| 2005/0097534 A1 | 5/2005 | Clement et al. | |
| 2006/0005171 A1 | 1/2006 | Ellison | |
| 2008/0120595 A1 | 5/2008 | O'Farrell et al. | |
| 2011/0145801 A1 | 6/2011 | Kaplinger et al. | |
| 2012/0216184 A1 | 8/2012 | Jones et al. | |

(Continued)

OTHER PUBLICATIONS

Mackenbach et al., "Coda: A Change Impact Analysis Tool for Scala", 2015, Delft University of Technology, 64 pages. (Year: 2015).*

(Continued)

*Primary Examiner* — Ted T. Vo
(74) *Attorney, Agent, or Firm* — Hunton Andrews Kurth LLP

(57) ABSTRACT

Systems and methods for implementing an embedded compiler running within a Java Virtual Machine that recompiles code changes on-the-fly are disclosed. An embodiment of the present invention is directed to using scripts within an application codebase to define what actions to take following a code change and recompilation on a particular set of code. An embodiment of the present invention ensures that the new code is made available to the rest of the live running system in a way that avoids class or data version conflicts.

20 Claims, 4 Drawing Sheets

(56) References Cited

U.S. PATENT DOCUMENTS

| | | |
|---|---|---|
| 2015/0100951 A1 | 4/2015 | Raundahl Gregersen |
| 2016/0232017 A1 | 8/2016 | Raundahl Gregersen |
| 2019/0205240 A1 | 7/2019 | Craik et al. |
| 2020/0065124 A1 | 2/2020 | Chen et al. |
| 2021/0117308 A1 | 4/2021 | Burgos |
| 2022/0147376 A1 | 5/2022 | Jaeger |
| 2022/0311794 A1* | 9/2022 | Maya ................. G06F 11/0766 |

OTHER PUBLICATIONS

"DCEVM, Enhanced Class Redefinition for Java", https://dcevm.github.io, last accessed on Oct. 1, 2024, pp. 1-2.

"FAQ What is hot code replace?—Eclipsepedia", https://eclipsse.org/, 2004, pp. 1-2.

* cited by examiner

COMPILATION AND EXECUTION OF CODE CHANGES WITHIN A RUNNING JAVA VIRTUAL MACHINE

FIELD OF THE INVENTION

The present invention relates generally to compilation and execution of code changes within a running Java Virtual Machine ("JVM").

BACKGROUND

Generally, current systems experience slow development cycles with complex applications having a large amount of source code to be recompiled and a large amount of data to reload whenever the application is restarted.

With large codebases (e.g., 1 million+lines of code), compilation times can be prohibitive to developer productivity. This is particularly noticeable with Scala where compile times per line are slower than Java. Restarting large applications is also prohibitively expensive as a result of reloading class files, Just-In-Time (JIT) compilation overhead, repopulating data caches, and calculating derived information. As a result, developers face challenges when writing new code and making changes to existing code. The full feedback cycle from making a change to seeing the impact of the change on the application is far too long and particularly problematic for GUIs where many small improvements are required to refine the exact layout.

Accordingly, there is a need for an improved system and method for compiling and executing code changes in applications running on Java Virtual Machines.

SUMMARY

Systems and methods for implementing an embedded compiler running within a Java Virtual Machine that recompiles code changes on-the-fly are disclosed. An embodiment of the present invention is directed to using scripts within an application codebase to define what actions to take following a code change and recompilation on a particular set of code. An embodiment of the present invention ensures that the new code is made available to the rest of the live running system in a way that avoids class or data version conflicts.

According to an embodiment, a computer-implemented system comprises: a computer server comprising one or more processors; a memory component storing one or more compilation plans; and non-transitory memory comprising instructions that, when executed by the one or more processors, cause the one or more processors to: execute, via the computer server, an application in a Java Virtual Machine (JVM); monitor, via a file watcher processor, a file change in a file running the application in the JVM; responsive to the file change, retrieve, via the memory component, a compilation plan associated with the file; wherein the compilation plan comprises: a set of source code and a post-compile script; compile, via a live compiler, the set of source code from the compilation plan; create, via a constructor processor, a non-delegating classloader; execute, via an executor processor, the post-compile script identified by the compilation plan; and provide, via an interface, an output feedback from the post-compile script while the application is running in JVM.

According to another embodiment, a computer-implemented method comprises the steps of: executing, via a computer server, an application in a Java Virtual Machine (JVM); monitoring, via a file watcher processor, a file change in a file running the application in the JVM; responsive to the file change, retrieving, via a memory component, a compilation plan associated with the file; wherein the compilation plan comprises: a set of source code and a post-compile script; compiling, via a live compiler, the set of source code from the compilation plan; creating, via a constructor processor, a non-delegating classloader; executing, via an executor processor, the post-compile script identified by the compilation plan; and providing, via an interface, an output feedback from the post-compile script while the application is running in JVM.

These and other advantages will be described more fully in the following detailed description.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Figure 1:
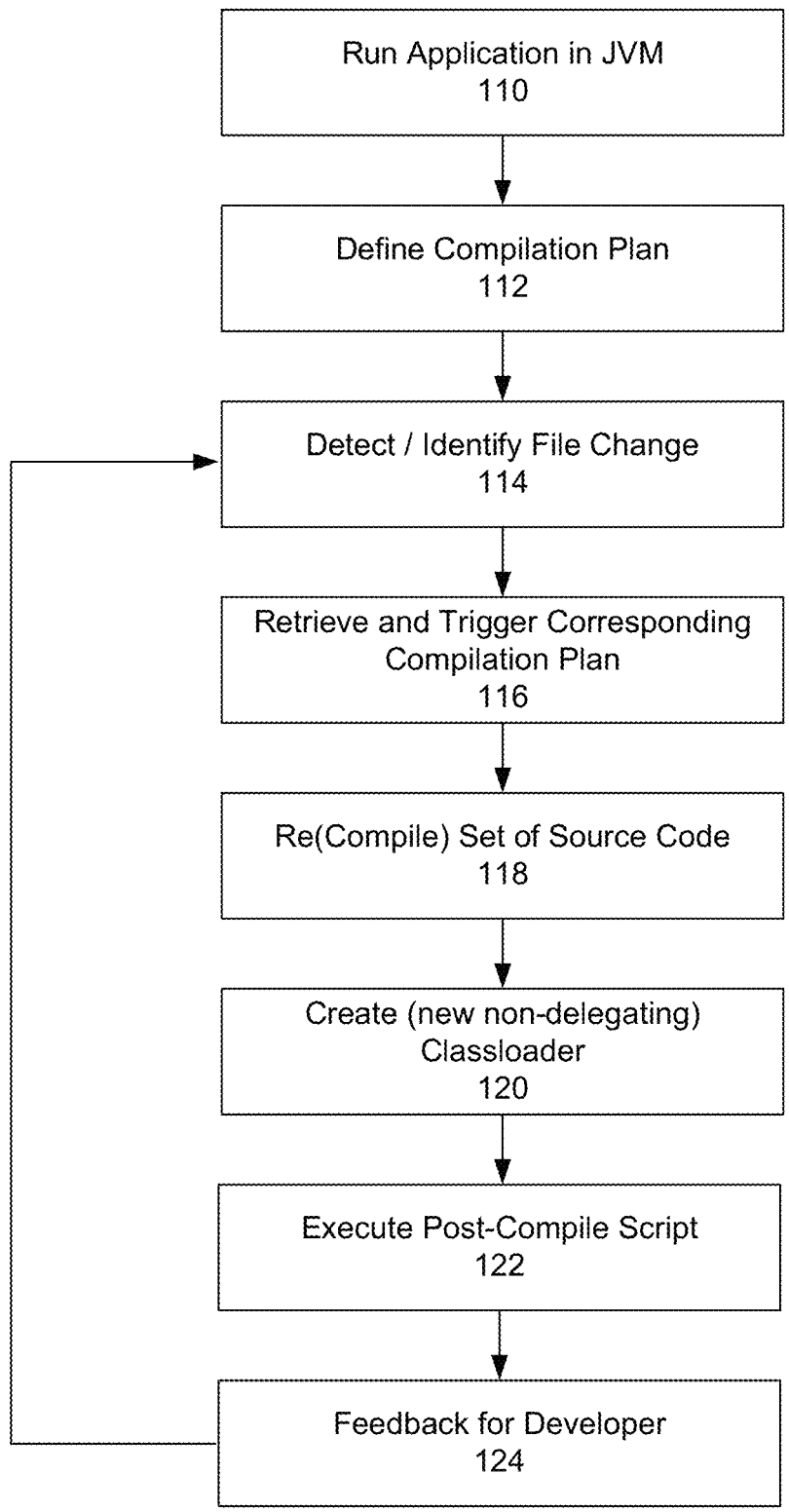
FIG. 1 is an exemplary flowchart, according to an embodiment of the present invention.

Exemplary embodiments of the invention will be described in order to illustrate various features of the invention. The embodiments described herein are not intended to be limiting as to the scope of the invention, but rather are intended to provide examples of the components, use, and operation of the invention.

An embodiment of the present invention is directed to an embedded compiler that runs within a Java Virtual Machine and recompiles code changes on-the-fly. Java Virtual Machine is a virtual machine that enables a computer to run Java programs as well as programs in other languages. Scala is a strong statically typed high-level general-purpose programming language that supports objected oriented programming and functional programming. Scala source code can be compiled by Java bytecode and run on a Java Virtual Machine. While a Scala compiler is described for illustration purposes, other compilers that output class files may be implemented.

An innovative approach uses scripts within an application codebase to define what actions to take following a code change and recompilation on a particular set of code. An embodiment of the present invention ensures that the new code is made available to the rest of the live running system in a way that avoids class or data version conflicts.

For example, existing data structures may need to be re-instantiated using new classes. One approach may involve serializing to a basic format the original data classes, then re-instantiating objects using the new version of that data class from the serialized format. With an embodiment of the present invention, developers may define the exact mechanics regarding how to make the recompiled code available to the rest of the running system.

An embodiment of the present invention enables developers to define Compilation Plans that: (1) indicate when any of these source files change; (2) recompile this set of source files; and (3) then execute this script to make the recompiled classes used by the running application.

An embodiment of the present invention supports a feedback process that enhances productivity by enabling developers to make changes, and then immediately assess whether the changes result in a desired effect. For example, the ability to iterate on changes is particularly relevant for polishing user interfaces within applications. Oftentimes, developers make many small incremental improvements and then individually assess each improvement relating to layout, usability, appearance, etc. In some cases, this may involve hundreds and hundreds of incremental changes. With an embodiment of the present invention, the impact of each change and iteration may be assessed immediately.

Java uses a one-time linkage at class loading time which presents a number of challenges to hot code replacement. Typically, solutions add a level of indirection, attempting to make the replacement. An embodiment of the present invention recognizes that conventional approaches to recompiling code and modifying running systems are limited due to the nature of one-time linkage in JVM. Conventional approaches only work in limited scenarios, namely, when modifying single methods or when following very specific patterns.

The use of scripts and giving control to developers provide the ability to deal with complexities of class cast exceptions and data transformation in specific situations. Class cast exceptions occur when code attempts to cast an object to another class that is not an instance and generally represents a runtime exception in Java when code improperly casts a class from one type to another.

An embodiment of the present invention is directed to recompiling code, loading classes within a new classloader, and then executing a developer's script. This provides flexibility and freedom to make the new code available to the running system.

An embodiment of the present invention may be applied to JVM based languages through various implementations including an integrated development environment (IDE) plug-in or other software component that works with very large codebases. Other implementations may be supported.

In addition, an embodiment of the present invention may be applied to a development environment for flexibility.

FIG. 1 is an exemplary flowchart, according to an embodiment of the present invention. At step 110, an application may run/execute on a Java Virtual Machine (JVM). At step 112, a Compilation Plan may be defined. At step 114, a file change may be identified or detected. At step 116, the Compilation Plan may be retrieved and triggered. At step 118, a set of source code may be compiled. At step 120, a new non-delegating classloader may be created. At step 122, a post compile script may be executed. At step 124, feedback may be provided to a developer. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 110, an application may run/execute on a Java Virtual Machine (JVM). An embodiment of the present invention is directed to supporting live coding within a strongly typed language such as Scala in a large codebase.

Restarting a computer program can be costly and time consuming as this involves reloading data and code. In the case of Java Virtual Machines, code has to be run through a Just-in-Time (JIT) compiler. Generally, compilation, JVM launch, and application logic are treated as separate processes.

An embodiment of the present invention provides a unified approach to live coding by blending compilation with application knowledge via customizable scripts, and then placing the scripts within the source code of the application (so they themselves are "hot compilable") that makes the approach understandable and flexible. Unification of application and compiler overcomes restart costs and efforts and provides a flexible approach to supporting recompilation of code and integration into a running JVM for rapid development. With the compiler becoming a part of the application, any data that has been loaded may be reused. Current approaches result in long starts and long compilation times. As a result, programmers avoid restarting applications or only compile a very limited subset of code. An embodiment of the present invention achieves a fast compile, execute and feedback cycle.

While working on a particular section of code, the developer may define a set of classes to recompile together on-demand, and the code to run in order to sufficiently make newly compiled classes integrated into a running system. An embodiment of the present invention is directed to recompiling a subset of code and exercising that code via flexible scripts to facilitate rapid application development. This further increases developer productivity and reduces the compile/restart cycle.

At step 112, a Compilation Plan may be defined. For example, a developer may interact with an interface to define a subset of source files to recompile, and a script to introduce the newly compiled code into a running system. Developer defined compilation plans may specify what to compile and when thereby minimizing compilation time as well as time spent working out what needs to be recompiled. The script may represent a post-compile script that defines a class/method to execute after recompilation within the same JVM as the application. In addition, the Compilation Plan may be automatically generated.

At step 114, a change within a file may be identified or detected. A file change may include any modification and may be detected through an automatic save or user input (e.g., button, trigger, etc.). The file may be part of a larger package.

At step 116, the Compilation Plan may be retrieved and triggered. An embodiment of the present invention is directed to enabling programmers to define what sets of source files to recompile and what script to run to make that modified code available. This may be bespoke to the section of code a programmer is modifying. Accordingly, the whole codebase does not have to be written in a certain way, and the system does not have to be in a globally consistent state after applying the new code. Rather, the system provides feedback to the programmer regarding their changes, thereby realizing efficiencies that minimize or avoid full compile/restart cycles.

At step 118, a set of source code identified in the Compilation Plan may be compiled. The specified files may be compiled using an embedded compiler, which may occur on-demand or automatically after a source file modification within the JVM referencing existing class files.

At step 120, a new non-delegating classloader may be created. According to an embodiment of the present invention, the classloader does not delegate to its parents, which means the newly compiled class files may be loaded even if the running JVM has already loaded them. An embodiment of the present invention uses a custom classloader to make newly recompiled classes available to a running system.

At step 122, a post compile script may be executed. An embodiment of the present invention enables developer written scripts to inject new code (objects/classes) into the running application, offering a high degree of flexibility. For example, a developer may specify a class/method ("post compile script") to run after the code is compiled. The newly compiled code may be loaded by its own new classloader. The specified "post compile script" may be executed. Accordingly, the code is made available to an application running within the JVM.

Various uses and applications may be supported. For example, data structures may be transformed, thereby providing new implementations of existing interfaces. Other uses may include: running a test, evaluating a function, visualizing results, and displaying a custom user interface. An embodiment of the present invention is directed to facilitating rapid application development by enabling a developer to exercise their modified code in some way without having to fully restart their system. This avoids having to solve a hot code replacement in the general case, or even for the whole current application. An embodiment of the present invention seeks to avoid full application restarts and eliminates costs and efforts associated with full class loading, reinitialization of application logic and data loading.

At step 124, feedback may be provided to a developer. An embodiment of the present invention minimizes feedback time to make code changes and then immediately view the impact. The modified code may be executed in the context of a live application. This may involve reusing existing classes and data to achieve immediate feedback for the developer.

Figure 2:
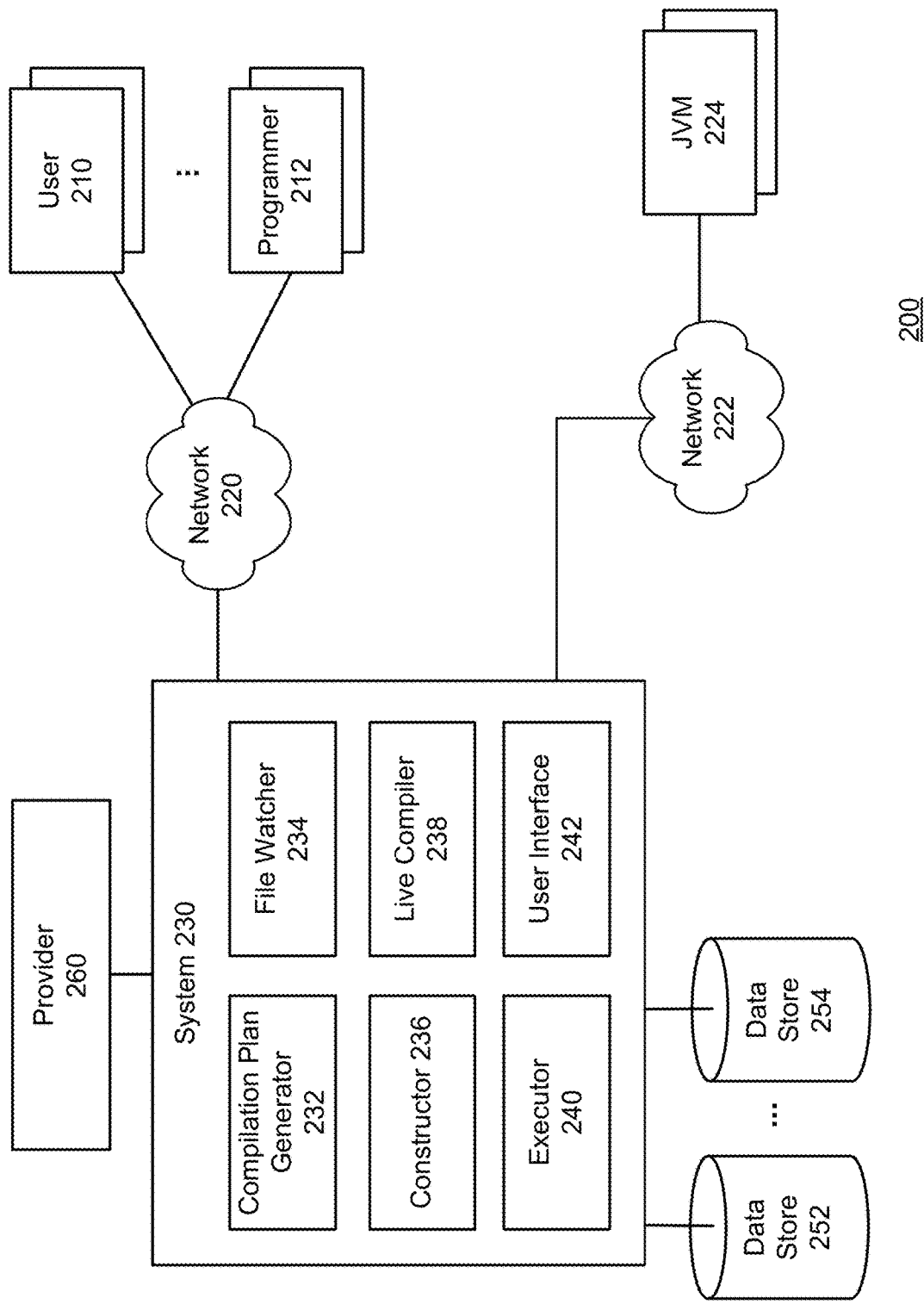
FIG. 2 is an exemplary overview diagram, according to an embodiment of the present invention.

FIG. 2 is an exemplary overview diagram, according to an embodiment of the present invention. FIG. 2 illustrates a schematic diagram of a system that implements an innovative approach for compilation and execution of code changes within a running JVM. As illustrated in FIG. 2, various Users 210, including Programmers 212, may interact with System 230 through Network 220 via various computing devices. Computing devices may include computers, laptops, workstations, kiosks, terminals, tablets, mobile devices, mobile phones, smart devices, etc.

Network 220 communicates with System 230 that supports compilation and execution of code changes within a running JVM. System 230 may include components that receive and generate events, including Compilation Plan Generator 232, File Watcher 234, Constructor 236, Live Compiler 238, Executor 240 and User Interface 242.

Compilation Plan Generator 232 may generate a dynamic set of developer managed Compilation Plans. A Compilation Plan may define which files/folders to watch; which source files to recompile and what to execute after compilation (post-compilation script).

A Compilation Plan may define what should be compiled, when it should be compiled and what script should be run after compilation. The action that triggers the Compilation Plan may impact what is compiled and what script should be run. Compilation Plans may include: a section that defines which (source) files to watch, and any changes to these files then trigger compilation by the Compilation Plan (e.g., it may be triggered by a user action, it may be triggered periodically); a section that defines what files to compile (e.g., this may be only the watched files that have changed, or all files in the same folder as the watched files that changed, or it may be all the watched files, it may also include additional files); and a section that defines what script to run after compilation (e.g., this may be a fixed script, or it may be a dynamically chosen script based on which watched files have changed, it may be the watched file itself if this file contains a class that implements one of the script types, hence any source file may contain a post-compilation script).

File Watcher 234 may watch for any changes in files and then trigger compilation. For example, an immediate trigger may occur on a save action rather than waiting for a user to invoke a trigger.

Constructor 236 may ensure each class is instantiated under the correct classloader/application context. In class-based, object-oriented programming, a constructor creates an object (initializes/constructs the state and value of the object) and prepares the object for use.

An embodiment of the present invention recognizes that linkage between classes occurs in Java only once at class load time. Whenever a classloader encounters a symbol for a method/constructor in another class, it asks its classloader to provide that target class. At this point once time initialization occurs, the classes are linked together. Usually classloaders delegate to their parents, so that only a single class of a given package/name is loaded. Accordingly, it is challenging to replace classes in a running JVM.

An embodiment of the present invention uses a "greedy" classloader that does not delegate to its parent. When a Compilation Plan is triggered, a set of source code is compiled and a classloader may be created that points at the resultant class files. The post-compilation script may represent a class that was compiled and may be available via this classloader. When it is executed, it may see all the other newly compiled classes. These classes are only visible to other classes loaded via the "greedy" non-delegating classloader, or its children classloaders. Accordingly, isolated islands of code may be executed. Once a class compiled by an embodiment of the present invention calls into a class loaded by a normal classloader, that class may not reference any of the "greedy" classloaders. With this limitation, various uses and applications may be realized including: writing unit tests which tend to be isolated entry points; writing a class that fulfils an interface or trait.

The non-delegating classloader overcomes constraints within JVM associated with one-time linkage, but even languages with less strict type systems have to overcome other problems related to live modification of running systems. Invariants related to one-time setup may be broken if those classes are initialized again. The post-compilation script approach provides flexibility to control what happens after recompilation, so the running system may be modified in ways that are safe or adequate for the developer. For example, some applications may involve data in the running system to be transformed. According to an embodiment of the present invention, one pattern may involve serializing some existing classes (to a common binary format), and then deserializing into newly compiled class types produced.

Live Compiler 238 may handle invoking a compiler, such as a Scala compiler. For example, the compiler may use a modified embedded Scala "Global" compiler, with support to reuse class path symbol parsing from prior compilations. Each Compilation Plan may define a set of source files to compile (avoiding costly inter-class dependency logic), which may be compiled using other classes that existed when the application was launched. This means that each compilation may be independent from other compilations. This may be limiting when working on larger changes. To support this, a Compilation Plan may depend upon the (most recent) output artifacts from another Compilation Plan. For example, a set of common interfaces or data carrying classes may be compiled by a first Compilation Plan. Then another Compilation Plan containing services that produce those classes may be recompiled using those. This supports a form of path-dependent compilation, where results from earlier compilations may be used by others.

Executor 240 may execute post-compilation scripts. An embodiment of the present invention may run as a subsystem of an application. In this case, the application does not have to be restarted but may instead recompile (and modify) itself. This approach avoids classloading, JIT and data load/initialization overhead. Accordingly, the application becomes the compiler.

Each of these components/services may be recompilable and replaceable by the pipeline where an embodiment of the present invention itself may be iteratively and interactively improved.

User Interface 242 may interface and communicate with User 210, Programmer 212 and others via Network 220. Applications may be executed through JVM, as shown by 224, through Network 222. FIG. 2 illustrates a JVM interacting with System 230 via Network. In addition, System 230 may run within a JVM. Other users and integrations may be supported.

The system components are exemplary and illustrative, System 230 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System 230 may be communicatively coupled to Data Stores 252, 254 as well as remote storages. Data stores 252, 254 may also store and maintain source code, reports, performance data, historical data, etc. These storage components may include any suitable data structure to maintain the information and allow access and retrieval of the information. The storage may be local, remote, or a combination. The storage components may have back-up capability built-in. Communications with the storage components may be over a network, such as Networks 220, 222, or communications may involve a direct connection between the various storage components and Provider 260, as depicted in FIG. 2. The storage components may also represent cloud or other network based storage.

The compilation and execution of code changes within a running JVM features described herein may be provided by System 230 and/or a third party provider, represented by 260, where Provider 260 may operate with System 230.

The system 200 of FIG. 2 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 is depicted, it should be appreciated that other connections and relationships are possible. The system 200 described below may be used to implement the various methods herein, by way of example. Various elements of the system 200 may be referenced in explaining the exemplary methods described herein.

Networks 220, 222 may be a wireless network, a wired network or any combination of wireless network and wired network. Networks 220, 222 may further include one, or any number of the exemplary types of networks operating as a stand-alone network or in cooperation with each other. Networks 220, 222 may utilize one or more protocols of one or more network elements to which it is communicatively coupled. Networks 220, 222 may translate to or from other protocols to one or more protocols of network devices. Although Networks 220, 222 may be depicted as one network for simplicity, it should be appreciated that according to one or more embodiments, Networks 220, 222 may comprise a plurality of interconnected networks, such as, for example, a service provider network, the Internet, a cellular network, corporate networks, or even home networks, or any of the types of networks mentioned above.

Data may be transmitted and received via Networks 220, 222 utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While FIG. 2 illustrates individual devices or components, it should be appreciated that there may be several of such devices to carry out the various exemplary embodiments. System 230 may communicate using any mobile or computing device, such as a laptop computer, a personal digital assistant, a smartphone, a smartwatch, smart glasses, other wearables or other computing devices capable of sending or receiving network signals. Computing devices may have an application installed that is associated with System 230.

An embodiment of the present invention may support various use cases and applications. An embodiment of the present invention may exploit unique properties of a graph/node execution environment. For example, as code is executed as a node graph, the code for particular nodes may be replaced. By clearing a cache (or invalidating sections of the live dependency tracker graph), a developer may make recompiled code available to the rest of system. In this example, nodes may be considered analogous to method calls where this approach may be considered equivalent to replacing a method body in "hot code replacement" in JVM.

An embodiment of the present invention may use a (runtime) Scala compiler to support hot compile and hot swap of UI views in a container. Hot compile may refer to compiling a subset of code while a JVM is running using its current dependencies. Hot swap may refer to taking newly hot compiled code and making it available within the current running JVM. An embodiment of the present invention may identify the script contents, and then wrap the contents in a containing class ensuring that each compile produces classes with a different name. This avoids issues regarding multiple ClassLoaders. Once a class file is generated, it may be constructed. Because it implements a known trait (or interface), it may be invoked with a suitable context. For example, it may be passed a Java OutputStream into which textual output could be written. It may be passed a suitable window handle into which it could render a UI. Further, it may be passed a http connection in order to send a message to some remote client.

An embodiment of the present invention provides a compilation mode that uses a custom classloader responsible for loading the newly compiled classes. A different classloader may be used on each compilation so the resultant classes do not clash with each other. In this mode, applied breakpoints may take effect on the hot compiled class. However, the compiler may be reinitialized for each compilation, otherwise symbols may clash between different compilation runs.

Another method of hot compilation may involve rewriting sources to place them in an isolated package (package-based).

Figure 3:
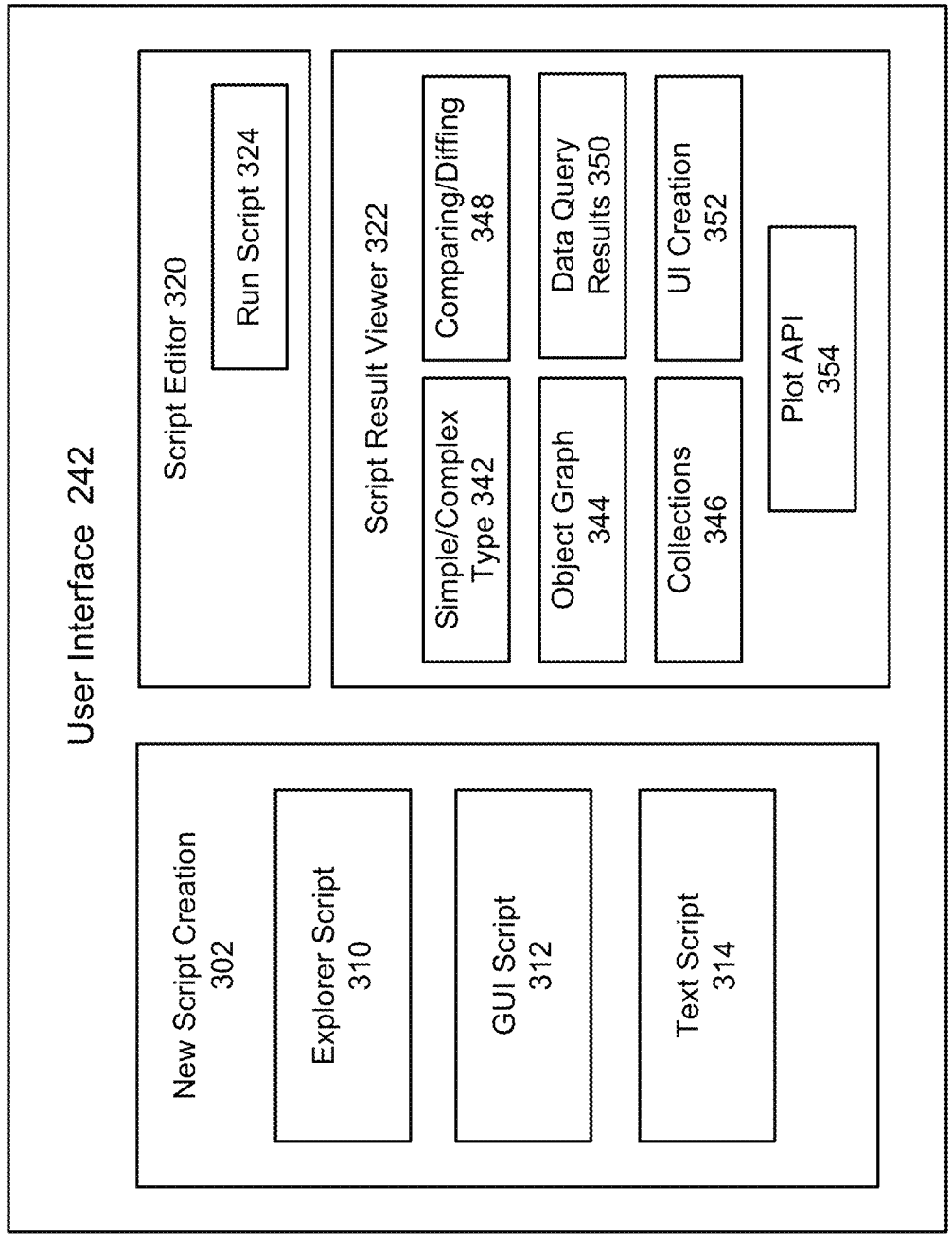
FIG. 3 is an exemplary user interface, according to an embodiment of the present invention.

FIG. 3 is an exemplary user interface, according to an embodiment of the present invention. An embodiment of the present invention enables developers to write, compile and execute code. A developer may write code directly into a user interface or edit files in folders that are being monitored where a change triggers recompilation and execution. For example, when the file is modified and saved, a callback may be received and the file may be compiled and then executed. FIG. 3 illustrates an exemplary user interface. Other user interfaces, functions and interactions may be supported.

As shown in the example of FIG. 3, developers may write code via User Interface 242 and then execute a "run script" icon 324 that may then initiate a compile and execute where the results may be shown in Script Result Viewer 322.

FIG. 3 illustrates an exemplary User Interface 242 with Explorer Script 310, GUI Script 312 and Text Script 314 enabling creation of scripts of particular kinds, as shown by New Script Creation 302. Using Run Script 324 to execute the script in Script Editor 320 then shows results in Script Result Viewer 322.

Script Result Viewer 322 may support various uses cases and applications, as shown by Simple/Complex Type 342; Object Graph 344; Collections 346; Comparing/Diffing 348; Data Query Results 350; UI Creation 352; Plot API 354 and others.

Simple/Complex Type 342 may support various basic data types of such as integers, strings and booleans. Complex types may include classes or structs (e.g., named groups of basic data types). An embodiment of the present invention may display fields, values, and definitions with no arguments (with a non-unit value).

Object Graph 344 enables users to navigate an object graph through various drill down modes. These are common in tools such as debuggers where users wish to visualize the data structures and relationships.

Collections 346 enables users to view collections in various formats. For a numbered table with results, properties may be extracted and represented as columns. Where the collections have items with different types, the columns may be merged. To programmatically show differences between two instances in an Explorer script, a "Diff" object may be used.

Comparing/Diffing 348 enables users to compare multiple instances of the same type.

Data Query Results 350 may display results of database queries as tables or other formats.

UI Creation 352 may enable users to create a UI to display data from within an application using simple UI controls such as Buttons, Labels, Text Inputs, Panels, etc.

Plot API 354 may be used to draw charts and graphs. Plot API may support various chart types. Complex uses may also be supported. A plot object constructed may support various options. Examples may include line charts, area charts, column charts, scatter charts, pie charts, bar charts, bubble charts, etc.

With Explorer Script 310, this script type may be the result of a value function and may be rendered using a generic object viewer. For example, script results may be displayed in a tabular form with an option to drill down into the data. This may be useful for exploring complex data such as Data Access Layer (DAL) entities, query results, etc. Explorer scripts may also plot data as graphs using the Plot API.

An embodiment of the present invention may use an embedded Scala compiler running within a process to hot compile and execute code instantly (sub-second). An embodiment of the present invention watches for changes/additions to a package. If any code within this package changes, then an embodiment of the present invention compiles it on the fly and displays the explorer interface. The application process stays "hot" so developers do not incur a startup overhead for each change. Caches continue to stay valid, so developers may get the benefit of any expensive nodes across the reruns as developers work. This applies to nodes that are not being hot-swapped so changes to any nodes are then reflected.

The Explorer Script enables developers to return any type, and it may be rendered in a GUI, with drill down capabilities. There is also support for customizing the GUI on a per-type basis and to further provide a rapid and intuitive way to understand complex data models. Classes responsible for generic and custom rendering of classes themselves support hot compile/hot swap, so the layout may be rapidly improved and customized with instant feedback showing the impact.

With GUI Script 312, scripts may return a GUI block that may then be displayed. This may be particularly suited for learning about UI, prototyping screens and applications, issue reproduction or incrementally developing apps. In addition, UI scripts may be used to display GUI widgets for rapid user interface prototyping.

With Text Script 314, script results may be displayed as a single String. As with Explorer scripts, an embodiment of the present invention may monitor a particular package and then compile and execute any changed scripts within that package.

According to an embodiment of the present invention, a "PackageHotSwapScript" may define a set of folders that are currently watched for changes and then recompiled. This file may be edited and it may itself be hot-compiled, so developers may dynamically add folders for hot compilation without restarting the JVM. An embodiment of the present invention may support full "package+subpackage" hot compilation, or any set of related packages.

An embodiment of the present invention is directed to package-level compilation. Package-level hot compilation provides the ability to write more significant pieces of code. In fact, a pipeline of the file watching, compilation, construction and evaluation may be hot compilable/hot swappable. Developers may make changes to code that may be compiled and used without restarting the JVM thereby avoiding initialization, classloading (or JIT-ing) each time a change is made.

For example, a developer may identify a package to be recompiled. This may be done by adding a file name, such as "PackageHotSwapScript" to the package, that may be executed following hot compilation. Accordingly, developers have a lot of freedom regarding this script which may be any valid script type.

An embodiment of the present invention recognizes a constraint of package-level hot compilation is that developers cannot depend directly on another hot compiled package/script. The hot compiled package may be compiled in the context of the other classes as they were at JVM launch time. If two hot compiled packages that directly depend upon each other are changed, they will fail to hot compile.

Another key constraint of package-level hot swapping is whether there are any external (e.g., not the current package), direct references upon classes/trait/objects within the hot compiled package. Those classes that depend directly upon classes within the hot compiled package are not themselves recompiled, so they retain a reference to the original class, not the hot compiled version. There may be class cast issues when instances of the hot compiled class are passed around the live system.

With an embodiment of the present invention, strong dependencies are minimized between pieces of code to promote encapsulation, and even make compilation faster as there are more self contained "islands" of code that may be compiled in parallel, independently and without causing massive upstream recompilations.

With an embodiment of the present invention, new code may be written where full restarts may be avoided thereby saving time and resources.

Figure 4:
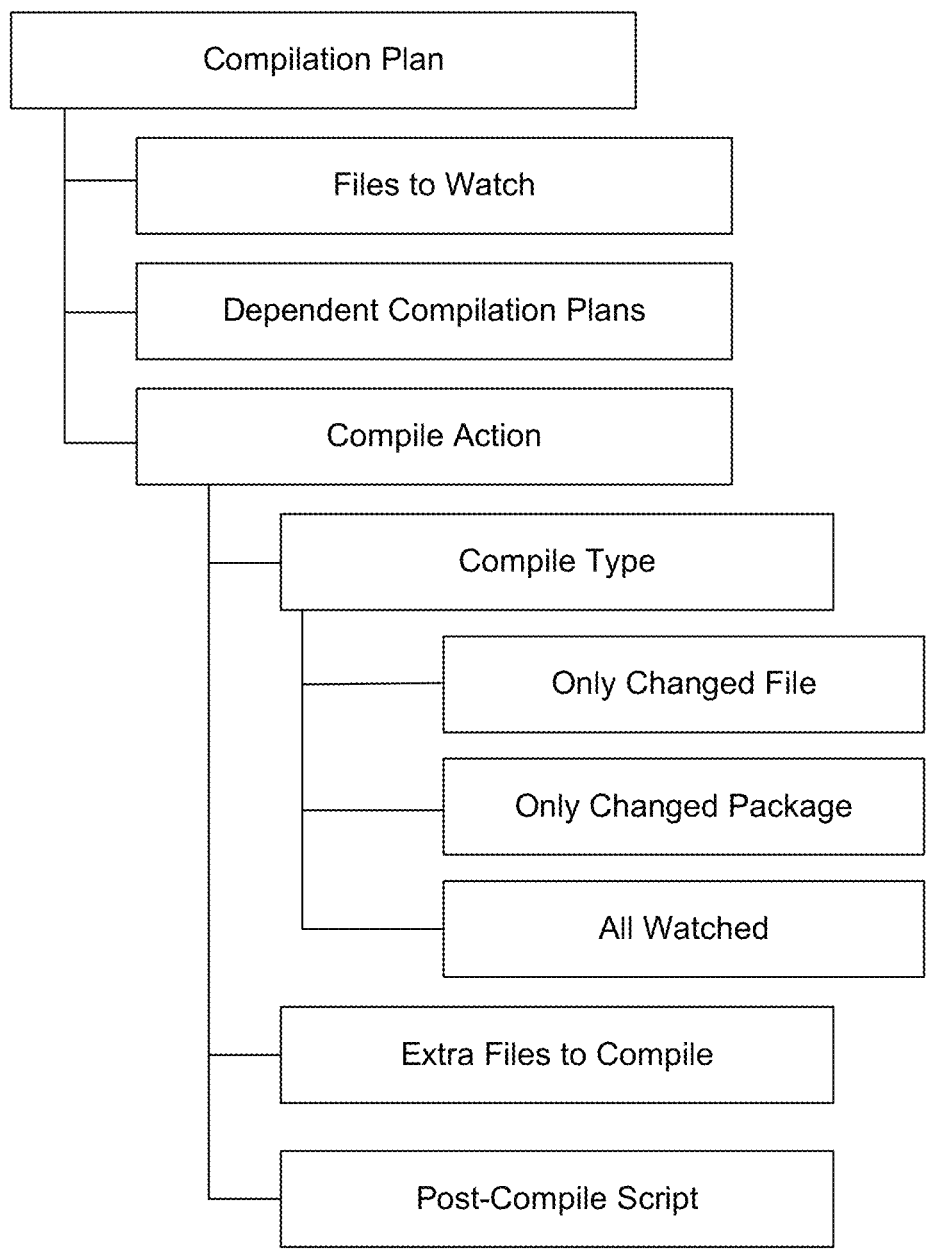
FIG. 4 is an exemplary illustration of a compilation plan, according to an embodiment of the present invention.

FIG. 4 is an exemplary illustration of a compilation plan, according to an embodiment of the present invention. As shown by FIG. 4, a Compilation Plan may include a set of Files to Watch, a set of parent Compilation Plans and a Compile Action. The Compilation Plan may define what should be compiled, when it should be compiled and the Post-Compile Script may identify the script that should be run after compilation. The Compilation Plan may include components relating to what to Watch, additional Dependencies and what to Compile. For example, the Compile Type component may instruct the compiler to compile only the file or package that contains a change, or compile all the watched paths and additional paths. Other variations may be supported.

Those skilled in the art will appreciate that the diagrams discussed above are merely examples of a system and a method for recompiling a subset of code and exercising that code via flexible scripts to facilitate rapid application development and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, IOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/ cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system comprising:
    a computer server comprising one or more processors;
    a memory component storing one or more compilation plans; and
    non-transitory memory comprising instructions that, when executed by the one or more processors, cause the one or more processors to:
        execute, via the computer server, an application in a Java Virtual Machine (JVM);
        monitor, via a file watcher processor, a file change in a file running the application in the JVM;
        responsive to the file change, retrieve, via the memory component, a compilation plan associated with the file; wherein the compilation plan comprises: a set of source code and a post-compile script;
        compile, via a live compiler, the set of source code from the compilation plan;
        create, via a constructor processor, a non-delegating classloader;
        execute, via an executor processor, the post-compile script identified by the compilation plan; and
        provide, via an interface, an output feedback from the post-compile script while the application is running in JVM.

2. The computer-implemented system of claim 1, wherein the live compiler comprises a Scala compiler.

3. The computer-implemented system of claim 1, wherein the compilation plan identifies what files to watch; what to compile; and one or more dependencies.

4. The computer-implemented system of claim 1, wherein the interface comprises an explorer script input, a GUI script input and a text script input.

5. The computer-implemented system of claim 1, wherein the interface comprises a script editor and a viewer.

6. The computer-implemented system of claim 1, wherein the non-delegating classloader loads a newly compiled class and a different classloader is used on each compilation.

7. The computer-implemented system of claim 1, wherein the compilation plan defines when a file changes, the set of source code is recompiled.

8. The computer-implemented system of claim 1, wherein the post-compile script is executed to generate a recompiled class used by the application in the JVM.

9. The computer-implemented system of claim 1, wherein the compilation plan is defined by a combination of case classes, traits and objects.

10. The computer-implemented system of claim 1, wherein the live compiler supports a hot compile and a hot swap of UI views in a container.

11. A computer-implemented method, comprising the steps of:
    executing, via a computer server, an application in a Java Virtual Machine (JVM);
    monitoring, via a file watcher processor, a file change in a file running the application in the JVM;
    responsive to the file change, retrieving, via a memory component, a compilation plan associated with the file; wherein the compilation plan comprises: a set of source code and a post-compile script;
    compiling, via a live compiler, the set of source code from the compilation plan;
    creating, via a constructor processor, a non-delegating classloader;
    executing, via an executor processor, the post-compile script identified by the compilation plan; and
    providing, via an interface, an output feedback from the post-compile script while the application is running in JVM.

12. The computer-implemented method of claim 11, wherein the live compiler comprises a Scala compiler.

13. The computer-implemented method of claim 11, wherein the compilation plan identifies what files to watch; what to compile; and one or more dependencies.

14. The computer-implemented method of claim 11, wherein the interface comprises an explorer script input, a GUI script input and a text script input.

15. The computer-implemented method of claim 11, wherein the interface comprises a script editor and a viewer.

16. The computer-implemented method of claim 11, wherein the non-delegating classloader loads a newly compiled class and a different classloader is used on each compilation.

17. The computer-implemented method of claim 11, wherein the compilation plan defines when a file changes, the set of source code is recompiled.

18. The computer-implemented method of claim 11, wherein the post-compile script is executed to generate a recompiled class used by the application in the JVM.

19. The computer-implemented method of claim 11, wherein the compilation plan is defined by a combination of case classes, traits and objects.

20. The computer-implemented method of claim 11, wherein the live compiler supports a hot compile and a hot swap of UI views in a container.

* * * * *